Nov. 14, 1961  F. I. TANCZOS ET AL  3,008,669
RAMJET MISSILE

Filed Jan. 5, 1955  2 Sheets-Sheet 1

INVENTORS
THOMAS DAVIS
EDWARD H. SMITH
FRANK I. TANCZOS
JAMES W. MULLEN II

BY
ATTORNEYS

Nov. 14, 1961     F. I. TANCZOS ET AL     3,008,669

RAMJET MISSILE

Filed Jan. 5, 1955     2 Sheets-Sheet 2

INVENTORS
THOMAS DAVIS
EDWARD H. SMITH
FRANK I. TANCZOS
JAMES W. MULLEN II

BY

ATTORNEYS

United States Patent Office 3,008,669
Patented Nov. 14, 1961

3,008,669
RAMJET MISSILE
Frank I. Tanczos, Washington, D.C., Thomas Davis and Edward H. Smith, Silver Spring, Md., and James W. Mullen II, Richmond, Va.; said Davis, said Smith, and said Mullen, assignors, by direct and mesne assignments, to the United States of America as represented by the Secretary of the Navy
Filed Jan. 5, 1955, Ser. No. 480,018
4 Claims. (Cl. 244—15)

This invention relates to reactive propulsion engines and more particularly to means for and methods of generating thrust and lift forces adjacent an external surface of an airfoil.

Conventional ramjet engines comprise a propulsion duct including a diffuser, an igniter, and a combustion tube propelled by the reaction of gases against the forward parts of the engine chamber. Air is continuously rammed into the forward end of the duct, is slowed down by the diffuser, and is greatly speeded up as it goes from the combusion chamber to exhaust, thus providing an increase in momentum.

In the case of ramjet engines operating in the supersonic region, the diffuser is subjected to a shock front behind which the flow is subsonic. Therefore, in ducted ram jet motors although the ramjet is moving at supersonic speeds the conversion of energy and combustion occur within the ducted zone and take place under subsonic conditions of flow.

The present invention is in theory supported by the fact that the release of heat in the airstream near an airfoil operating in the subsonic or supersonic region can produce a thrust on the airfoil together with a desirable drag reduction. Since there is no known practical way of adding heat to a supersonic stream, the airstream, in accordance with the present invention, is caused to break down by normal shock so that external combustion may be carried out under subsonic flow conditions in a region where flame stabilization is possible.

One method of achieving external burning is by feeding a gaseous, liquid, or granular solid rocket fuel or monopropellant from a supply system through nozzles to the outer surface of the airfoil. If desired, initial fuel decomposition or preparation may be made to take place within the interior of the airfoil in suitable combustion chambers to produce a rocket thrust by the rapidly expanding exhaust products of combustion discharging through the nozzles into the adjacent high pressure airstream. The rocket fuel or monopropellant may be such that these exhaust products of internal combustion will include carbon and hydrogen which will be self-ignitable upon contacting the airstream adjacent the airfoil thereby producing a ramjet thrust. The ramjet thrust component and the rocket thrust component will produce a resultant forward thrust attributable to the combined jet and rocket action.

An important object of the invention is the provision of means for and methods of producing thrust and lift by external combustion.

Another object of the invention is to obtain thrust and lift by combustion adjacent an external surface of an airfoil.

A further object of the invention is to provide an airfoil structure suitable for subsonic and supersonic speeds with means for releasing heat in the airstream adjacent the airfoil for reducing the aerodynamic drag and producing a thrust on the airfoil.

Another object of this invention is to provide a ductless airfoil structure with means producing a rocket thrust by self-combustion within the airfoil and a ramjet thrust by burning the exhaust products from the internal self-combustion in the atmosphere externally of the airfoil.

Still another object of this invention is to provide a supersonic ductless airfoil with a power plant suitable for supplying fuel to an outside combustion region adjacent the airfoil so as to modify supersonic airstream characteristics.

Other objects and many of the attendant advantages of this invention will be readily appreciated as the same becomes better understood by reference to the following detailed description when considered in connection with the accompanying drawings wherein.

Figure 1:
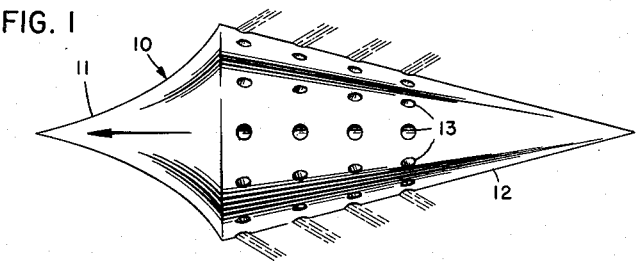
FIG. 1 is a side elevational view of an embodiment of the present invention.

Referring to the drawings in which like numerals represent like elements in the various views, there is illustrated a series of airfoil structures assumed to be traveling in the direction of the arrows. As each airfoil travels through the air the compression wave formed ahead of the leading edge is divided so that a portion flows outwardly on each side of the airfoil. With the airfoil operating in the subsonic range, fuel may be added to the airstream adjacent the airfoil and burned to impart forward thrust with a low operating efficiency. As the airfoil attains sonic and supersonic speeds, a shock wave pattern is formed along forward portions of the airfoil surface, and in the after portions of the airfoil a tremendously increased drag is developed which interferes with efficient operation in the supersonic range. Since it has been found impractical heretofore to add heat in large amounts to a supersonic stream to reduce this objectionable drag, a new and improved method of breaking down a supersonic stream by normal shock ahead of the combustion region has been devised so as to carry out the actual combustion under subsonic flow conditions. Moreover, burning in the present invention occurs in a subsonic region and the exhaust products of combustion expand to ambient pressure.

The embodiment illustrated in FIG. 1 shows the upstream portion of the airfoil structure 10 as a tapering conical convergent nose 11 which will produce a shock wave relative to the axis of the airfoil. The trailing downstream surface 12 of the airfoil 10 is a slender, tapering conic structure containing a plurality of selectively spaced burner ports 13 from which the products of internal self-combustion of suitable propellants emerge and produce a rocket thrust on the airfoil. Additionally, the combustion products are burned with air which mixes in from the surrounding airstream.

In subsonic flow, as the airstream crosses the flame front, a resultant normal force on the airfoil surface is obtained which acts to give lift and reduce drag. The effect of the heat addition, as by flame, is to reduce the flow velocity in the free stream yielding a pressure higher than ambient at the flame front.

In the case of supersonic flow, if the flame front is stabilized and if the heat added to the airstream is sufficiently high, the flow ahead of the flame will break down by a shock which is approximately normal over the reception area for the flame. In the zone behind the normal shock front, that is downstream, combustion will proceed to give propulsive forces by external combustion.

Any suitable gaseous, liquid, and/or solid fuels or propellants may be used to provide sufficient heat release, such as an acetylenic type fuel, which is of such a nature as to be largely or completely combustible with the passing airstream. As will be appreciated by considering the fuel nozzle systems illustrated in the various embodiments to be described, flight control may be governed by selectively positioning and throttling the various fuel nozzles.

Figure 2:
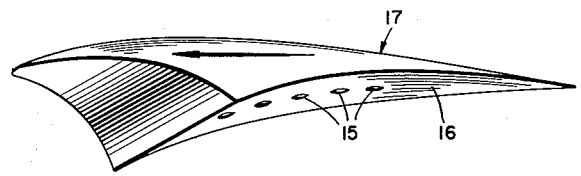
FIG. 2 is a longitudinal perspective view of a modified embodiment of the present invention.

In FIG. 2 is shown another embodiment of the invention in which a system of burners 15 is used on but one side 16 of an oblique type supersonic airfoil structure 17 to provide suitable aerodynamic properties for lift. The structure of FIG. 2 will produce a modified shock pattern ahead of the subsonic region of the burner ports 15.

Figure 3:
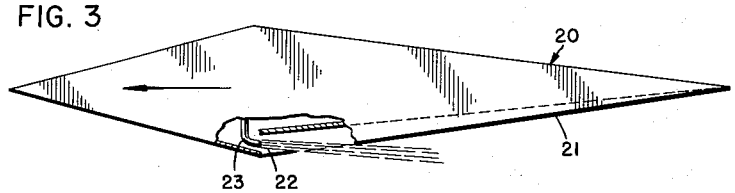
FIGS. 3 and 5 are side elevational views, partly in section, of double wedge airfoils illustrating various means for supplying fuel to the airstream adjacent the airfoil.
Figure 5:
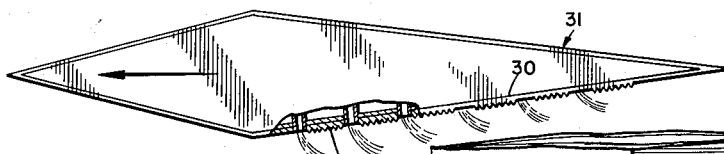
Figure 6:
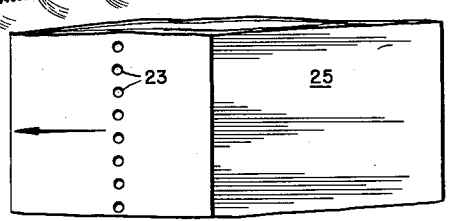
FIG. 6 is a bottom plan view showing a fragmentary portion of an airfoil with nozzles located in the upstream section of the airfoil.

In FIG. 3 is illustrated a simple substantially symmetrical double wedge supersonic airfoil 20 with a pivoted lower rear surface 21 normally aligned with the double wedge airfoil shape but which can be raised to form a niche or channel 22 for the fuel injection nozzles 23 which will then be shielded to afford greater flame stability. Although the fuel nozzle 23 shown in FIG. 3 is directed downstream, fuel injection may alternatively be directed upstream as shown in FIG. 6, or partly cross stream and partly constrastream as shown in FIGS. 9 and 10, or cross stream and downstream as shown in FIGS. 5, 7 and 8.

Figure 4:
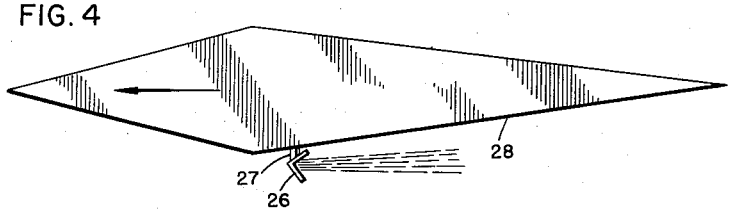
FIG. 4 is a side elevational view of a double wedge airfoil having a gutter flame holder.

In FIG. 4 is shown a gutter type flame holder 26 affixed on a nozzle 27 through which fuel is carried to the flame holder. This flame holder provides flame stability and is mounted sufficiently far out from the airfoil surface 28 that a normal shock will be created ahead of the gutter. Another means for providing flame stabilization is shown in FIG. 5 wherein a rough ceramic coating 29 is employed on a downstream lower rear surface 30 of the double wedge airfoil structure 31. The ceramic coating 29 may be activated with a suitable chemical so as to catalyze the combustion reaction. Although the nozzles illustrated in FIG. 5 supply fuel normal to the airstream, the fuel may be injected upstream or downstream.

Figure 7:
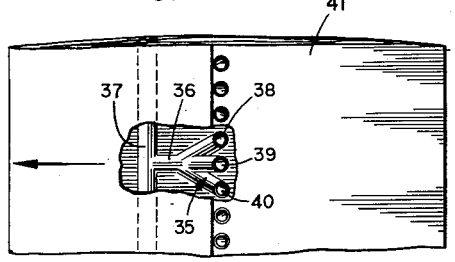
FIG. 7 is a bottom plan view showing a fragmentary portion of an airfoil having a section broken away to indicate nozzle disposition.
Figure 8:
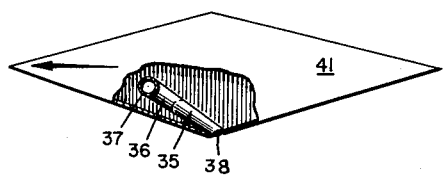
FIG. 8 is a side elevational view of the airfoil shown in FIG. 7.

The fuel injection system 35 illustrated in FIGS. 7 and 8 utilizes a monofuel, such as propyne, to obtain thrust and lift. Each individual branch 36 from the fuel line 37 is equipped with three nozzles 38, 39 and 40, one pointing directly toward the rear and downstream, and two that are canted slightly toward opposite sides in order to obtain better mixing of the fuel with the surrounding airstream throughout the span of the airfoil 41. Individual rockets are spaced along the span of the airfoil and as they are fired the decomposition products will be ignited and burned downstream from the rocket exhaust. It will thus be apparent that thrust and lift compoznents are obtainable directly from the rocket exhaust as well as from the downstream combustion in accordance with the degree of downward and rearward canting of the nozzles.

Figure 10:
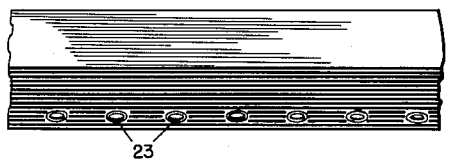
FIG. 10 is a front elevational view of the airfoil shown in FIG. 9.
Figure 11:
FIG. 11 is a schematic diagram of a fuel supply system employed in the airfoil.
Figure 9:
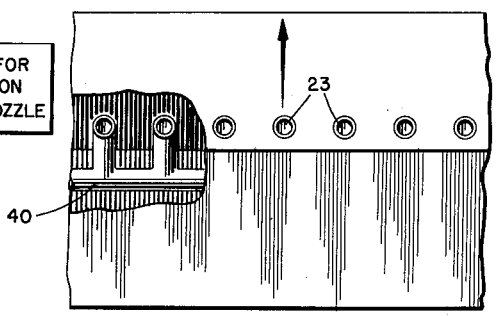
FIG. 9 is a fragmentary bottom plan view of another embodiment in which the discharge nozzles are directed upstream.

The fuel injection system illustrated in FIGS. 9 and 10 represents a means for injecting fuel contrastream or upstream thereby advancing the normal shock wave upstream. A common manifold 40 distributes fuel to the individual nozzles 23 which extend through the lower forward section of the airfoil at the desired angle. FIG. 11 diagrammatically illustrates a fuel supply system employing conventional apparatus which is intended to be incorporated in an airfoil, however, this fuel system when employed as a flight augmenter in aircraft may be installed in a suitable chamber apart from the airfoil.

Figure 12:
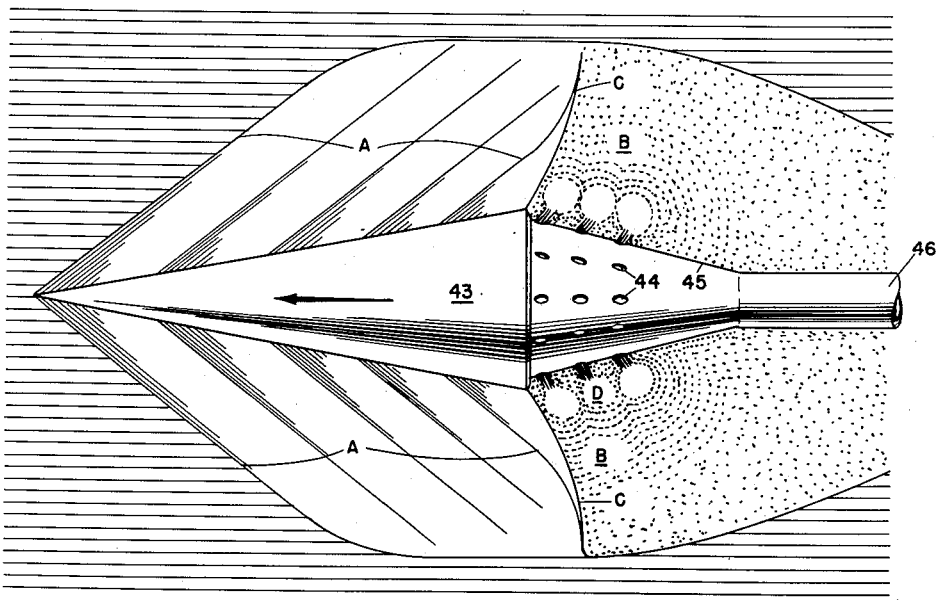
FIG. 12 is a diagrammatic view derived from a Schlieren photograph and illustrating supersonic airflow.

To more clearly illustrate the operation of an airfoil constructed in accordance with the present invention, there is illustrated in FIG. 12 a drawing derived from a Schlieren photograph in which a further modification of a simple airfoil 43 similar to that shown in FIG. 1 and having fuel nozzles 44 distributed about the downstream section 45, was supported within a supersonic wind tunnel. A shock wave pattern A commencing at the upstream edge of the airfoil progressed up to the flame front B in which area a normal shock wave C occurred due to the addition of a sufficient amount of heat into the airstream. The fuel was hydrogen, supplied to the nozzles 44 through the hollow supporting shaft 46. The arrangement of FIG. 12 provides a sheltered subsonic combustion zone behind the normal front. The oblique deflection of the shock pattern away from the combustion zone is observable in the Schlieren photograph.

Although it cannot be expected that propulsive forces attainable from external combustion can be had at specific impulse values as high as a ducted engine, it is contemplated that in the Mach number range of 2 to 4 and at selected air fuel ratios impulses higher than those attainable with rockets may be generated. However, it does appear that lift may be obtained more economically from external combustion than from a ducted engine combined with wings flown at an angle of attack.

Obviously many modifications and variations of the present invention are possible in the light of the above teachings. It is therefore to be understood that within the scope of the appended claims the invention may be practiced otherwise than as specifically described.

What is claimed is:

1. A reactive propulsion engine comprising an airfoil suitable for supersonic flight having a nose portion and a sheltered rear portion, said nose portion diverging toward said rear portion and said rear portion diverging toward said nose portion with the maximum cross-sectional area thereof disposed at the junction of said nose portion with said rear portion and normal to the longitudinal axis thereof, and means for supplying combustible fuel into the airstream downstream adjacent said maximum cross-sectional area and within said sheltered portion of the airfoil to introduce heat into the airstream in an amount sufficiently to break down the supersonic airstream by normal shock and allow continuous combustion of said fuel within said sheltered portion under subsonic conditions.

2. A propulsion engine for supersonic flight comprising an airfoil having a wedge-shaped front portion and a wedge-shaped rear portion, said front portion diverging toward said rear portion and said rear portion diverging toward said front portion with the maximum cross-sectional area thereof disposed at the junction of said front portion with said rear portion and normal to the longitudinal axis thereof, a lower pivoted downstream wall and a lower fixed upstream wall on the airfoil, said downstream wall being movable vertically with respect to said upstream wall for providing an opening between the walls, means including nozzles positioned within said opening to supply fuel to the airstream for combustion downstream and alongside the airfoil subjacent said maximum area thereof to heat the airstream an amount sufficiently to cause the supersonic airstream to break down by normal shock and thus form a subsonic combustion zone downstream from said normal shock.

3. A propulsion engine for supersonic flight comprising a supersonic hollow airfoil having a front and a rear wedge-shaped portion, said front portion diverging toward said rear portion and said rear portion diverging toward said front portion with the maximum cross-sectional area thereof disposed at the junction of the front wedge-shaped portion with the rear wedge-shaped portion and normal to the longitudinal axis thereof, fuel nozzles carried by said airfoil and disposed downstream from said maximum area portion of the airfoil, means disposed within said airfoil for supplying and distributing fuel to said nozzles, and flame holder means and downstream from said maximum area of the airfoil to break down the supersonic airstream by normal shock to form a subsonic combustion zone aft of said maximum area portion of the airfoil.

4. A propulsion engine for supersonic flight comprising a ductless airfoil for supersonic and subsonic flight and having a rearwardly tapered nose section and a forwardly tapered rear section with the maximum cross-sectional area thereof disposed at the junction of said rearwardly tapered nose section with said forwardly tapered rear section and normal to the longitudinal axis of the nose and rear sections, fuel nozzles carried by said airfoil and disposed subjacent said maximum area thereof, means disposed within the airfoil for supplying fuel to said nozzles, a ceramic coated surface on said rear section and activated with a suitable catalyst on the airfoil and disposed in proximate relation with respect to said nozzles so as to catalyze the combustion process downstream as fuel is injected into the airstream adjacent the ceramic surface and aft of the maximum area of the airfoil.

References Cited in the file of this patent

UNITED STATES PATENTS

| | | |
|---|---|---|
| 1,376,316 | Chilowsky | Apr. 26, 1921 |
| 2,376,834 | Thompson | May 22, 1945 |
| 2,468,787 | Sharpe | May 3, 1949 |

FOREIGN PATENTS

| | | |
|---|---|---|
| 194,853 | Germany | Jan. 30, 1908 |